United States Patent

Ishida et al.

[11] Patent Number: 6,055,411
[45] Date of Patent: Apr. 25, 2000

[54] RADIO COMMUNICATION SYSTEM HAVING A WIRELESS CELL SITE

[75] Inventors: Kazuhito Ishida; Noriyuki Sugiura, both of Yokohama, Japan

[73] Assignee: Hitachi, Ltd., Tokyo, Japan

[21] Appl. No.: 08/844,432

[22] Filed: Apr. 18, 1997

[30] Foreign Application Priority Data

Apr. 22, 1996 [JP] Japan .................................. 8-100322

[51] Int. Cl.$^7$ .................................................. H04Q 7/20
[52] U.S. Cl. .......................................... 455/11.1; 455/11.1
[58] Field of Search .................................. 455/11.1, 422, 455/435, 436, 433, 440, 445, 452, 456, 462, 464, 512, 524; 370/315, 492, 274, 279, 293, 501

[56] References Cited

U.S. PATENT DOCUMENTS

| | | | |
|---|---|---|---|
| 5,260,987 | 11/1993 | Mauger | 455/445 |
| 5,305,466 | 4/1994 | Taketsugu | 455/445 |
| 5,363,429 | 11/1994 | Fujisawa | 455/422 |
| 5,408,679 | 4/1995 | Masuda | 455/11.1 |
| 5,568,654 | 10/1996 | Fukawa | 455/456 |
| 5,634,197 | 5/1997 | Paavonen | 455/512 |
| 5,640,680 | 6/1997 | Ishida et al. | 455/411 |
| 5,710,764 | 1/1998 | Yoshimura et al. | 455/11.1 |
| 5,724,665 | 3/1998 | Abbasi et al. | 455/465 |
| 5,749,053 | 5/1998 | Kusaki et al. | 455/524 |
| 5,768,267 | 6/1998 | Raith et al. | 455/435 |

*Primary Examiner*—Dwayne D. Bost
*Assistant Examiner*—Jean A. Gelin
*Attorney, Agent, or Firm*—Antonelli, Terry, Stout & Kraus, LLP

[57] ABSTRACT

A radio communication system comprises at least one switching system, at least one first CS (Cell Site) connected to the switching system, at least one second CS which is not connected to the switching system, and a plurality of PSs (Personal Station). The first CS accommodates a plurality of radio channels that can be dynamically established between the PSs and the second CS. The second CS accommodates a plurality of radio channels that can be dynamically established between the PSs, the first CS and other second CS, and has the function of relaying the radio channels.

9 Claims, 5 Drawing Sheets

RADIO COMMUNICATION SYSTEM HAVING A WIRELESS CELL SITE

BACKGROUND OF THE INVENTION

1. Field of the Invention

The present invention relates to a radio communication system, or more specifically to a communication system comprising a cell site (CS) which is not connected to a switching system and a communication method thereof.

2. Description of the Related Art

Radio communication systems for portable telephones such as cellular systems and cordless telephone systems are known, which comprise a cell site which assigns channels dynamically for connecting a plurality of personal stations (PS) through a radio channel and a line switching network (switching system) for connecting a plurality of cell sites to each other by radio channels or cable lines.

JP-A-6-178345 discloses a technique in which a standby radio channel is provided between CSs, and when a fault occurs in the line between a CS and a switching system, the communication is routed between the CSs through the standby radio channel so that a network and a PS are connected by avoiding the fault point. This technique concerns a method of connecting a PS to a switching system through two CSs, but no method is described for connecting the switching system on the network side to the PS.

A method for an automobile telephone system is described in JP-A-5-68282, wherein in case of a line fault between switching systems, a connection in speech is routed using an adjacent CS, thereby circumscribing the faulty point.

On the other hand, JP-A-4-196626 discloses a technique in which a radio terminal routes signals in a mobile communication system.

These techniques, which provide emergency means in case of a system or line fault, have a limit in the number of applicable connections and applicable status of connection.

In ordinary radio communication systems, installation of a new CS requires the construction of a cable transmission path for connecting the CS to a switching system or the assignment of a new radio frequency band to the CS for connecting the CS and the switching system through a radio channel.

As a result, installation of a new CS is expensive.

SUMMARY OF THE INVENTION

Accordingly, the object of the present invention is to provide a communication system in which a CS can be installed at low cost.

In order to achieve the above-mentioned object, according to one aspect of the invention, there is provided a radio communication system comprising a plurality of CSs including at least one first CS which is accommodated in a communication network, at least second CS which is not included in the communication network, and at least a PS, wherein the first and second CSs accommodate a plurality of radio channels capable of being dynamically established for a communication to be started with the PS or with other CSs, and the second CS establishes a radio channel for communication with the PS or another first or second CS, and also a radio channel for communicating with the other first or second CS and relaying the communication between the two radio channels.

According to another aspect of the invention, there is provided a radio communication system capable of routing the communication between CSs using a radio channel which is to be dynamically assigned for PSs. As a result, a CS can be connected to an intended communication network through at least one other CS accommodated in the communication network. It is therefore not necessary to install a cable transmission path for connecting the communication network with CSs nor to assign a dedicated radio frequency channel to a CS for connection with the communication network.

The present invention is useful for adding a CS temporarily in case of an emergency or for adding a CS in view of the difficulty of laying a transmission path to a switching system.

DESCRIPTION OF THE PREFERRED EMBODIMENTS

The present embodiment employs a radio communication system based on the personal handy phone system according to RCR STD (Reseach & Development Center for Radio Systems Standard) -28.

Generally, a radio communication system comprises a plurality of interconnected switching systems (SW), a plurality of CSs associated with the respective SWs, and a plurality of PSs connected to the respective CSs.

Figure 1:
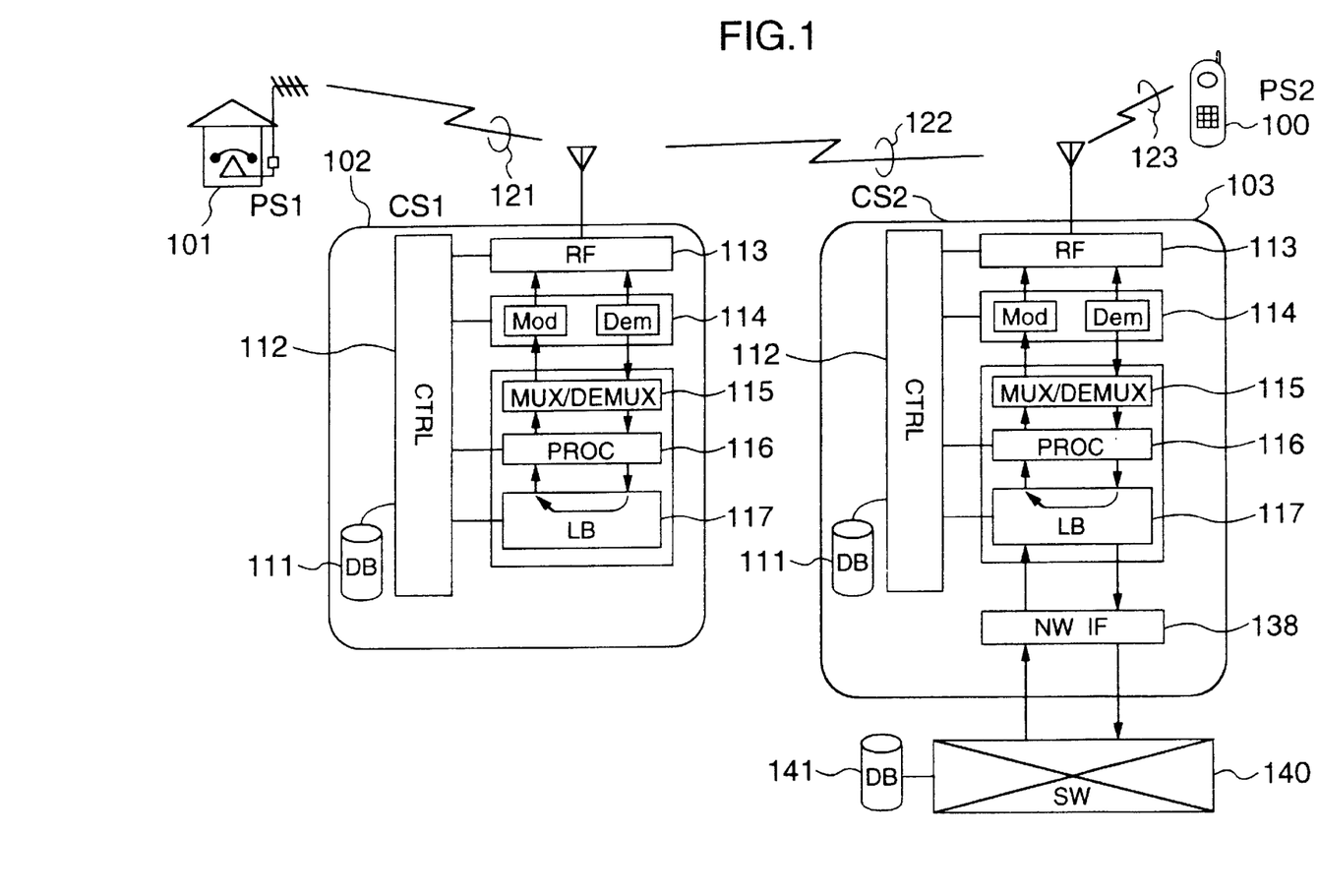
FIG. 1 is a block diagram showing a configuration of a radio communication system.

FIG. 1 shows an example configuration of a part of a radio communication system comprising a switching system SW 140, CS2 103 connected to SW190, and CS1 102 which is not connected with the SW.

SW 140 includes a data base 141 for location registration. CS1 102 is connected to CS2 103 and PS1 101 by radio channels 122, 121, respectively. Also, PS2 100 is connected to CS2 103 through a radio channel 123. A radio channel having a quality higher than a predetermined requirement is dynamically assigned for these channel connections, taking interference and noise into consideration.

Now, a explanation will be given for CS1 and CS2.

As shown, CS1 102, which is not connected to SW 140 includes a radio frequency unit (RF) 113, a modem 114, a multiplexer/demultiplexer (MUX/DEMUX) 115, a digital signal processing unit (PROC) 116, a loop-back circuit (LB) 117, a control unit 112 and a data base 111. The radio frequency unit 113 and the modem 114 are for transmitting and receiving radio frequency signals. The multiplexer/demultiplexer 115 is for multiplexing the transmission signals corresponding to radio frequency transmission channels and demultiplexing the received signal into the respective radio channels. The digital signal processing unit 116 is for extracting the control information from the received signal and for inserting the control information into the transmission signal. The control unit 112 controls the insertion of the control signal in the digital signal processing unit 116 and the returning of the signal from the loop-back circuit 117 in accordance with the control information extracted in the digital signal processing unit 116, thereby realizing various sequences described later. The data base 111 holds the information on the location registered PSs and the information for identifying other CSs.

CS2 103, which is connected to SW 140 has substantially the same configuration as CS1 102. In addition to the configuration of CS1 102, however, CS1 103 has a network interface circuit 138 for connecting to the SW 140. Also, when CS2 conducts no relay operation, the loop-back circuit 117 may be omitted.

Assume, for example, that CS1 102 has received a signal through a radio channel 121 assigned to PS1 101. This received signal is sent through the radio frequency unit 113, the modem 114, the multiplexer/demultiplexer 115 and the digital signal processing unit 116 to the loop-back circuit 117. The signal transmitted from PS1 101 to the loop-back circuit 117 is returned toward the transmission-side circuit of CS1 102. The signal thus returned is processed in digital signal processing unit 116, multiplexer/demultiplexer 115, modem 114 and radio frequency unit 113, and further transmitted to CS2 103 through radio channel 122 set with CS2. In CS1 102, the return operation can realize the connection of two radio channels.

In CS2 103, on the other hand, the signal received from CS1 102 through the radio channel 122 is input to a loop-back circuit 117 through radio frequency unit 113, modem 114, multiplexer/demultiplexer 115 and digital signal processing unit 116. The loop-back circuit 117 sends the signal to a network interface circuit 138 without loop back. The network interface circuit 138 transmits the signal from CS1 102 to a switching system 140 through a channel set up with the switching system 140 for the radio channel 122.

The signal from the switching system 140 to PS1 101 is first sent to CS2 103 through the line set between the switching system SW 140 and the CS2 103. In CS2 103, the signal received from SW 140 at the network interface circuit 138 is processed through the digital signal processing unit 116, the multiplexer/demultiplexer 115, the modem 113 and the radio frequency unit 113, and transmitted to CS1 102 through the radio channel 122 set with CS1 102. In CS1 102, the signal received through the radio channel 122 is sent to the loop-back circuit 117 through the radio frequency unit 113, the modem 114, the multiplexer/demultiplexer 115 and the digital signal processing unit 116. The signal sent from CS2 103 to the loop-back circuit 117 is returned to the transmission circuit of CS1 102. The signal thus returned is processed in the digital signal processing unit 116, the multiplexer/demultiplexer 115, the modem 114 and the radio frequency unit 113 on transmission side, and transmitted to PS1 101 through the radio channel 121 set with PS1 101.

According to this embodiment, a channel is established between PS1 101 and SW 140 through the intermediary of CS1 102.

Assume that CS2 103 has received a signal through the radio channel 123 assigned to PS2 100. In CS2 103, the signal received through the radio channel 123 is applied to the loop-back circuit 117 through the radio frequency unit 113, the modem 114, the multiplexer/demultiplexer 115 and the digital signal processing unit 116. The loop-back circuit 117 sends the signal to the network interface circuit 138 through the switching system 140 without loop-back. The network interface circuit 138 transmits the signal from PS2 100 to SW 140 through the channel set with SW 140 for the radio channel 123.

The signal from SW 140 to PS2 100, on the other hand, is first sent to CS2 103 through the line set between SW 140 and CS2 103. In CS2 103, the signal received from the switching system by the interface circuit 138 is processed in the digital signal processing unit 116, the multiplexer/demultiplexer 115, the modem 114 and the radio frequency unit 113, and further transmitted to PS2 100 through the radio channel 123.

In this way, a channel is established between SW 140 and PS2 100 through a single CS as in the prior art.

Figure 6A:
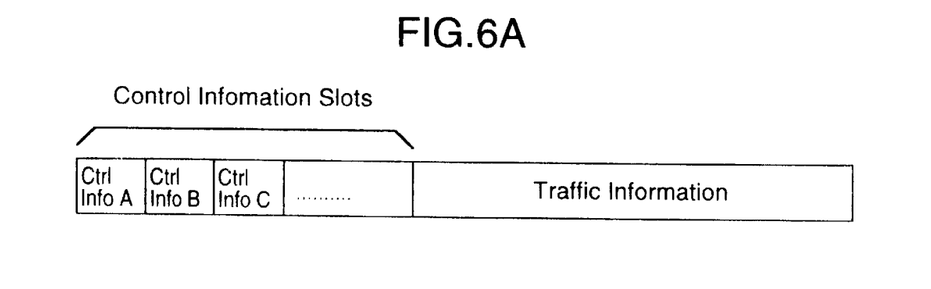
FIGS. 6A and 6B show example frame configurations of a traffic channel for relaying by a CS.
Figure 6B:
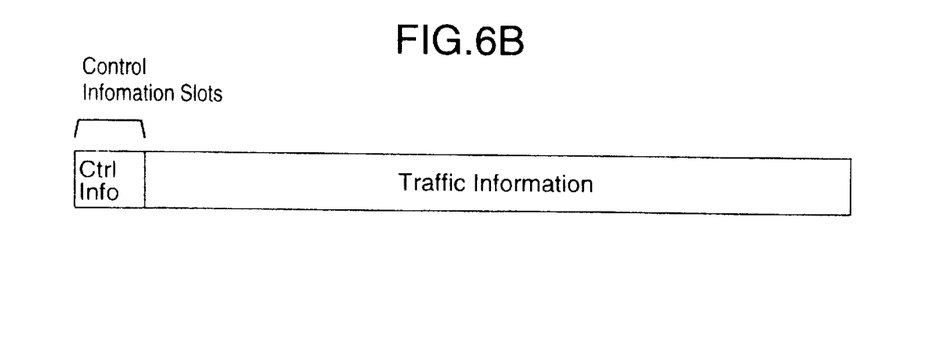

A method of signal loop-back, i.e., a method of relay for CS1 will now be described in detail. A link channel is established through the same procedure as normal channel other than the relay. After the link channel is set, however, a service channel is routed by one of the following-described two ways. FIGS. 6A and 6B show a frame configuration of a traffic channel (TCH) used for the respective methods.

One method includes returning the received signal directly in the loop-back circuit 117 and transmitting it through the radio frequency unit 113. In this case, the digital signal processing unit 116 determines a signal type, that is whether the signal is to be relayed to other radio stations (or performs the process for returning a rejection signal in the case where the signal cannot be relayed). When the signal is the one to be relayed, a channel selector in the digital signal processing unit 116 does not perform the frame termination process but the loop-back circuit 117 directly returns the signal for transmission. The transmitting end of the digital signal processing unit 116 inserts the local station ID in the frame. As a result, an area for writing an overhead signal (for channel control) for the next transmission channel is required to be prepared in the signal frame (FIG. 6A). In FIG. 6A, the information to be relayed is contained in the slots of Control Info A, B, C and so forth. The circuit at the transmitting end writes these control signals, sets a radio channel with the next radio station and, upon complete setting of the channel, starts the communication. This method secures the area of the overhead signal for a plurality of relay channels and may reduce the area usable for the frame assigned to the traffic information. Nevertheless, the process in the radio stations relaying the signal is simplified.

A second method is provided such that after the received signal is terminated at the digital signal processing unit 116, each component of the received signal is returned to the transmitting end by the loop-back circuit 117 and the frame is reconstructed at the transmitting end of the digital signal processing unit 116. According to this method, the control information area of the received frame is rewritten according to the relayed channel. The new channel connection information between radio stations, including a newly-connected radio station ID, is added to the control information. Consequently, the control information can occupy only one slot, and therefore a larger area can be secured for assignment to the traffic information. The frame reconstruction increases the processing burden of the CS, but the frame can transmit more information (FIG. 6B).

According to this embodiment, PS1 101, PS2 100, CS1 102 and CS2 103 register their locations in the nearby CSs before starting communication, i.e., before assignment of a radio channel. The location is registered when the power supply of the PSs and CSs is turned on.

First, the operation of location registration will be explained.

In FIG. 1, PS1 101 registers the location in CS1 102, PS2 100 in CS2 103, CS1 102 in CS2 103, and CS2 103 in CS 102.

The data base 111 of each CS is registered with the information on the PSs and the CSs located in the cell covered by the particular CS. The data base 141 of the switching system 140, on the other hand, holds all of the identifiers and the location information (the information on the cell in which a CS or a PS is located) of the CSs and PSs belonging to the particular switching system.

In the case of any change which may occur in the contents of the data base 111, each CS informs the switching system and requests the switching system to update the data base 141 in the switching system. Each CS can accept the registration of a plurality of other CSs which are connectable with it.

Figure 2:
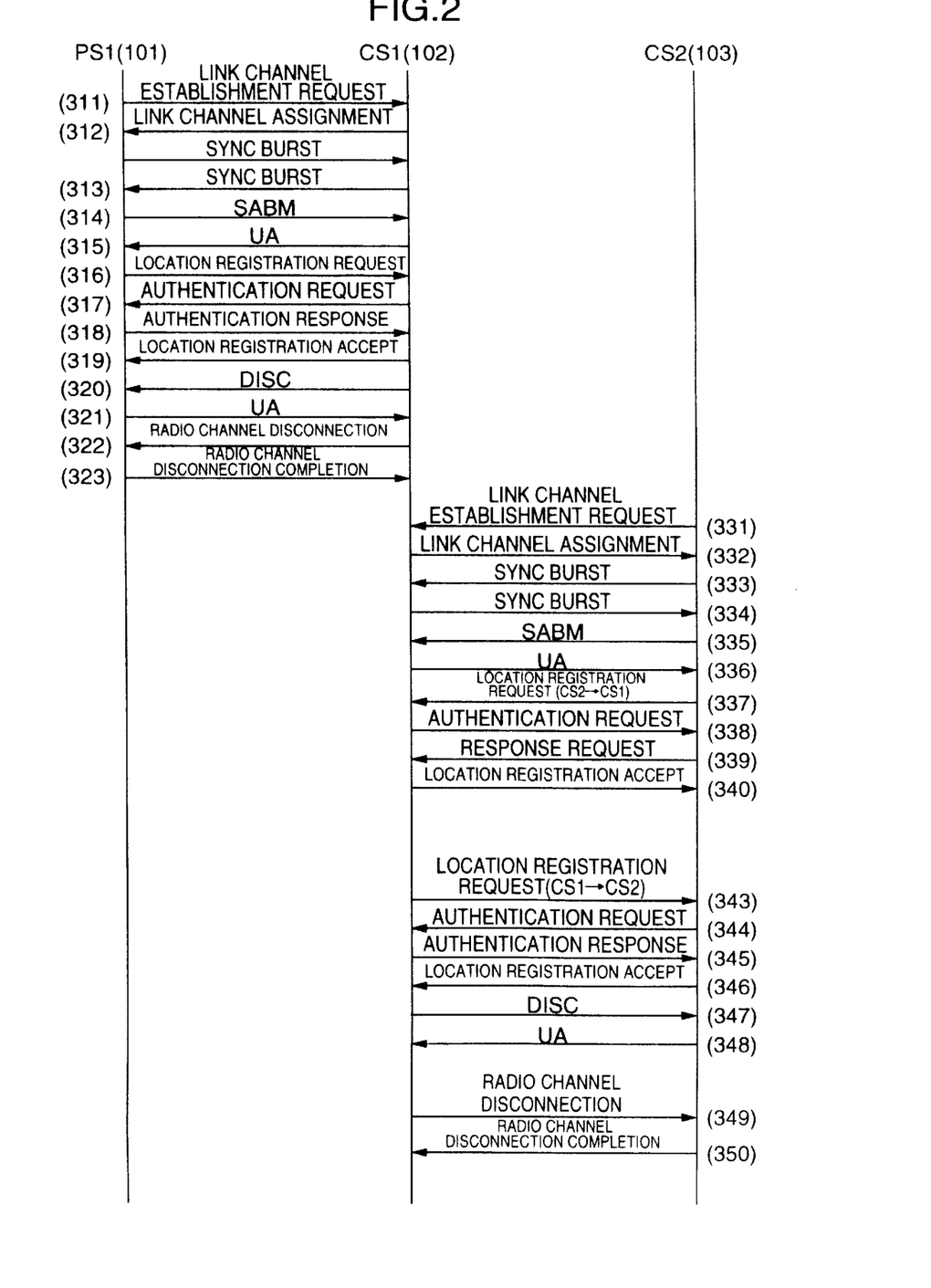
FIG. 2 is a diagram showing a communication sequence at the time of location registration in a radio communication system.

The sequence of the location registration is shown in FIG. 2.

In FIG. 2, numerals 311 to 323 designate the sequence of location registration of PS1 101 in CS1 102. Numerals 331 to 350 designate the sequence of location registration of CS1 102 in CS2 103, and the sequence of location registration of CS1 102 in CS2 103.

As shown, in the sequence of location registration of PS1 101 in CS1 102, PS1 101 transmits a link channel establishment request using a channel on a specific time slot on the frequency channel called a logical control channel (311). Upon receipt of a link channel assignment notifying the assignment of a link channel from CS1 102 through the logic control channel, PS 101 exchanges a sync burst (313) with a CS (CS1 102 in this case) which has transmitted the particular link channel assignment, using the assigned link channel, thereby setting up the synchronization for transmission and receipt on the link channel.

Once the synchronization of transmission and receipt is set up for the link channel, PS1 101 transmits an SABM requesting the set-up of a multi-frame link to CS1 102 using this link channel (314). Upon receipt of a UA as a response to the SABM from CS1 102 (315), PS1 101 sends a request for location registration to CS1 102 using the multi-frame link (316). In response to this request, a request is sent from CS1 102 for the authentication information to authenticate the PS (317). Then, the authentication information is sent to CS1 102 as an authentication response (318). Upon normal completion of authentication of CS1 102 and upon receipt of the location registration acceptance informing that the location registration has been accepted (319) with a DISC instructing to disconnect the multi-frame link (320), PS1 101 sends a UA (321) to CS1 102 as a response to the DISC. Upon receipt of an instruction (322) to disconnect the radio channel, the disconnection completion of the radio channel is notified thereby to release the radio channel (323).

The sequence 331 to 340 of location registration of CS2 103 in CS1 102 and the sequence 343 to 350 of location registration of CS1 102 in CS2 103 are also performed in the same manner as the sequence of location registration of PS1 101 in CS1 102. In the former case, however, the radio channel and the multi-frame link that have already been set up are used for the location registration of both CS 1 102 and CS 103. A predetermined authentication information assigned to a CS is used as the authentication information for the particular CS.

Also, though not shown, the sequence of location registration of PS2 100 in CS2 103 is performed in the same manner as the sequence of location registration of PS1 101 in CS1 102.

Upon completion of the location registration for PS1 101, CS1 102 and CS1 102 in this way, the identification information and authentication information of the PSs and other CSs registered in each CS are stored in the data base 111 of the CS. Also, each time of a new location registration therein, each CS1 102 and CS2 103 notifies the SW 140 of the change of the location registration. In FIG. 1, CS1 102 notifies SW 140 through CS2 that PS1 101 and CS2 103 are registered therein, and CS2 103 notifies SW 140 that CS1 102 and PS2 100 are registered therein. The transmission of location information between CSs uses an arbitrary traffic channel or a dedicated channel as in the case of normal data. SW 140 accumulates the contents of the location registration notified from each CS in the data base 141 thereof. The sequence of connection and communication to the switching system from each CS is similar to the calling sequence of CS in the calling sequence from PS described below.

First, an explanation will given for the sequence of a call from PS1 101.

Figure 3:
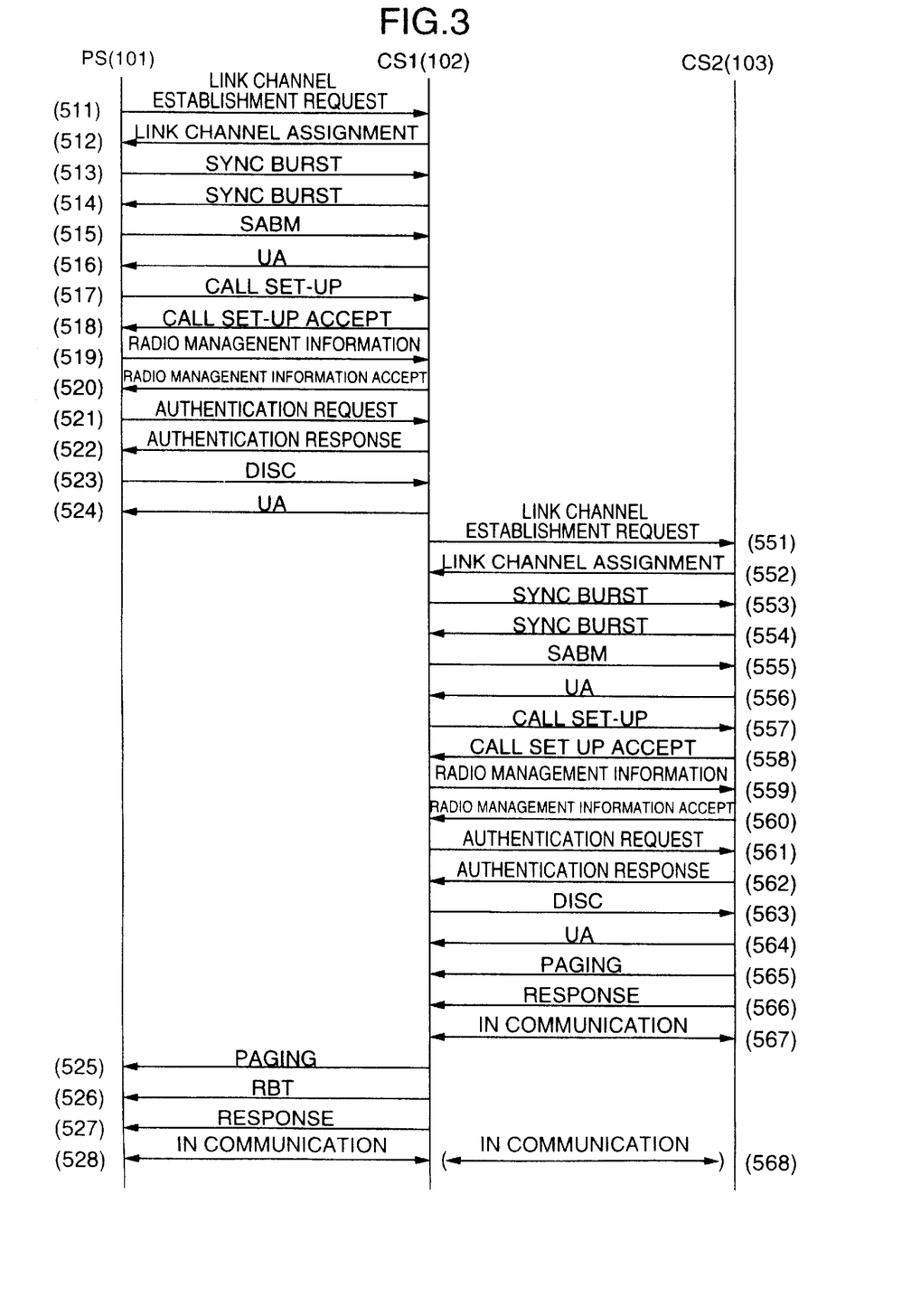
FIG. 3 is a diagram showing a communication sequence at the time of a call-out from a PS in a radio communication system.

The sequence of a call from PS1 101 to other PS connected to SW (network) 140 is shown in FIG. 3.

As shown, first, PS1 101 is assigned a link channel from CS1 102 in the same manner as in the location registration described above (511 to 514). Once a link channel is assigned, a multi-frame link is set on the particular link channel in the same manner as in the location registration described above (515, 516). A call set-up message is transmitted to CS1 102 using the multi-frame link (517). Upon receipt of a call set-up acceptance indicating the acceptance of the call set-up (518), the radio management information is sent to CS1 102 (519). CS1 102 determines the contents set-up for the radio channel (service channel) to be set using this radio management information. Also, CS1 102 transmits the radio management information acceptance to PS1 101 (520). PS1 101, upon receipt of the radio management information acceptance, transmits an authentication request signal (521). Upon receipt of an authentication response indicating the authentication from CS1 102 (522), DISC (523) and UA (524) are exchanged to disconnect the multi-frame link. In this process, a radio channel (service channel) is set up between PS1 101 and CS1 102.

Upon the authentication completion of PS1 101, CS1 102 is assigned a link channel from CS2 103 in the same manner as in the case of location registration described above (551 to 554). Upon assignment of a link channel, as in the location registration described above, a multi-frame link is set on the particular link channel (555, 556). Using the multi-frame link thus set, the call setting message already received from PS1 101 is sent to CS2 103 (557). Upon receipt of a call setting acceptance indicating the acceptance of a call set-up (558), the radio management information is sent to CS2 103 (559). CS2 103 returns the radio management information acceptance to CS1 102 (560). CS1 102, upon the receipt of the radio management information acceptance, sends an authentication request signal (561) for authentication, and upon the receipt of an authentication response indicating the authentication from CS2 103 (562), DISC and UA are exchanged to disconnect the multi-frame link (563, 564). Now, a radio channel (service channel) is set up between CS1 102 and CS2 103. CS1 102 connects the radio channel with PS1 101 to the radio channel with CS2 103.

Upon the authentication completion of CS1 102, CS2 103 transmits a call set-up received from CS1 102 to the switching system 140 using an unoccupied one of the channels with SW 140. Upon receipt of the call set-up acceptance from SW 140, the channel with SW 140 is connected to the radio channel with CS1 102.

CS1 102 then receives the paging signal and response sent from the switching system through CS2 103 (565, 566). Once the channel with the called party PS is established by the call set-up transmitted from PS1 101 through CS2 103 and SW 140 (567), CS1 102 transmits a paging signal (525) and RBT (ring-back tone) (526) and response (527) to PS1 101.

Now, the channel between PS1 101 and the called PS becomes in-communication state (528, 568).

An explanation will be given for a call originated from PS2 100.

In the call origination sequence in this case, the call origination sequence of PS2 100 registered in CS2 103 conforms to that from PS2 100 through CS2 103 when CS1 102 in FIG. 3 is replaced by PS2 100.

Now, an explanation will be given for when PS1 101 is called from a PS connected to the switching system (network) 140.

Figure 4:
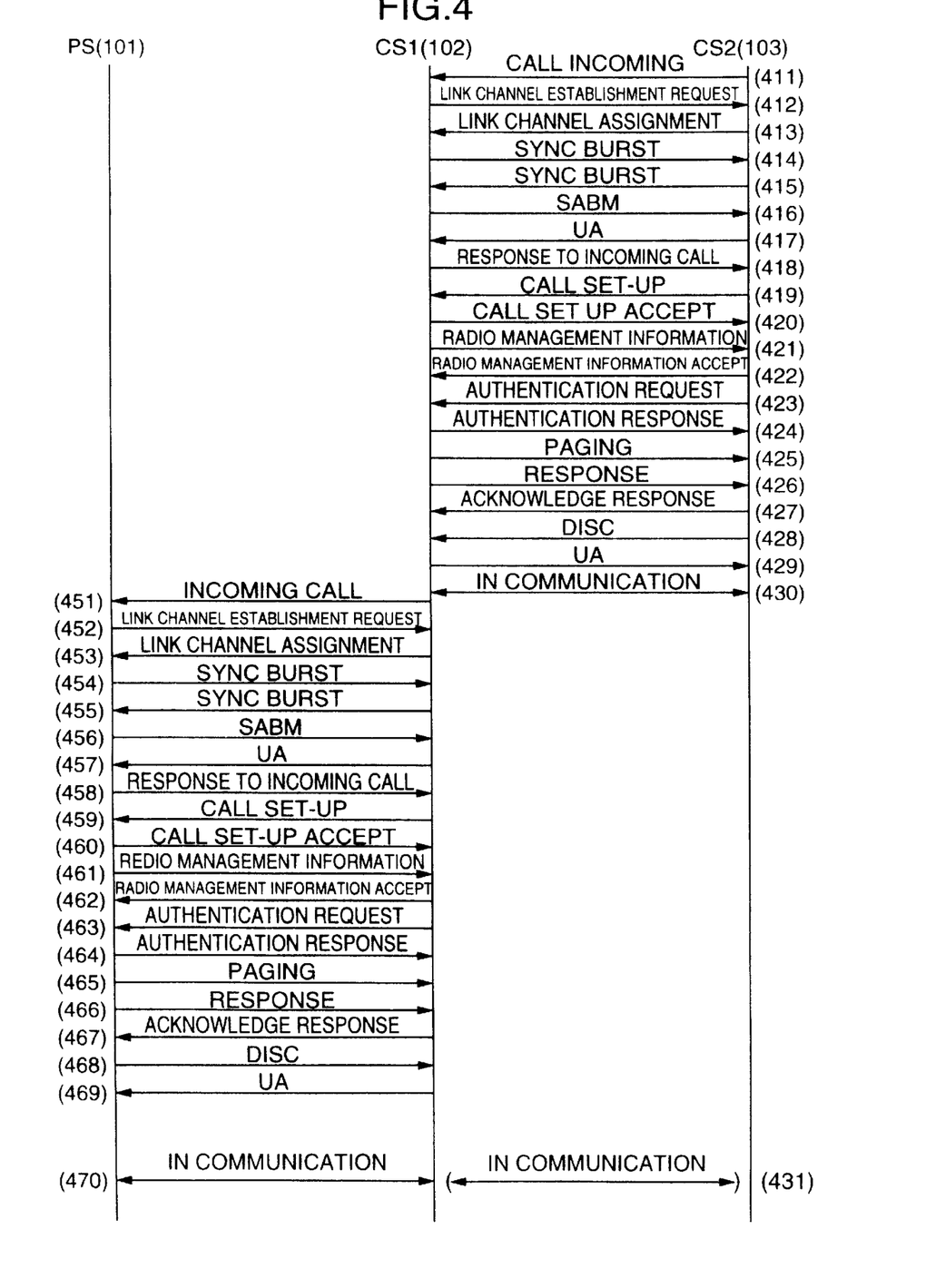
FIG. 4 is a diagram showing a communication sequence at the time of a call-in to a PS in a radio communication system.

The sequence in this case is shown in FIG. 4.

In this case, CS2 103 accepts an incoming call and call set-up message from SW 140 through the channel with SW 140. The set-up message of SW 140 includes, in addition to the identifier of PS1 101, all the identifiers up to PS1 101 in the order of call routing. The switching system 140 selects the shortest route on the basis of the location information of each CS notified earlier from each CS and accumulated in the data base 114, and includes in the call set-up message the identifiers of the CSs in the route up to the called party PS.

Upon acceptance of the call set-up message including the identifiers of CS1 102 and PS1 101, CS2 103 transmits a incoming call message to CS1 102 using the logical control channel described above in the presence of an unoccupied channel, if any (411).

CS1 102 that has received the incoming call message sets up a link channel with CS2 103 (412 to 415), and sets up a multi-frame link (416, 417). Subsequently, as shown, messages, including paging, response and, acknowledgment response, are exchanged in addition to messages for incoming call response, call set-up, call set-up acceptance, radio information and authentication (418 to 427). Then, the multi-frame link is released (427, 428). If there is any unoccupied radio channel that can be used for connection to PS 1 101, the radio channel (service channel) is set up with CS1 103. On the basis of the identifier of PS1 101 included in the call set-up received from CS2 103, CS1 102 transmits an incoming call message to PS1 101 (451).

Then, PS1 101 that has received the incoming call message, sets up a link channel with CS1 102 (452 to 455), and sets up a multi-frame link (456, 457). Subsequently, as shown, messages, including paging, response and acknowledgment response, are exchanged in addition to messages for incoming call response, call set-up, call set-up acceptance, radio information and authentication (458 to 467), thus setting up a radio channel (service channel) with CS1 102. FIG. 4 shows the case in which the user of PS1 101 places the handset off-hook in accordance with a call.

On the other hand, CS1 102 connects the radio channel assigned to PS1 101 and the radio channel with CS2 103.

Thus, a channel is established between the call of PS1 101 and the called party so that the channel between them becomes in-communication status (470, 431).

Now, an explanation will be given for the case in which PS2 100 is called from a PS connected to SW (network) 140.

The sequence in this case conforms with the call-incoming sequence to PS2 100 through CS2 103 when CS1 102 of FIG. 3 replaced by PS2 100. This sequence, however, corresponds to the case in which the user of PS1 101 places the handset off-hook in accordance with a call.

Explanation was made above about a radio communication system according to this embodiment.

Figure 5:
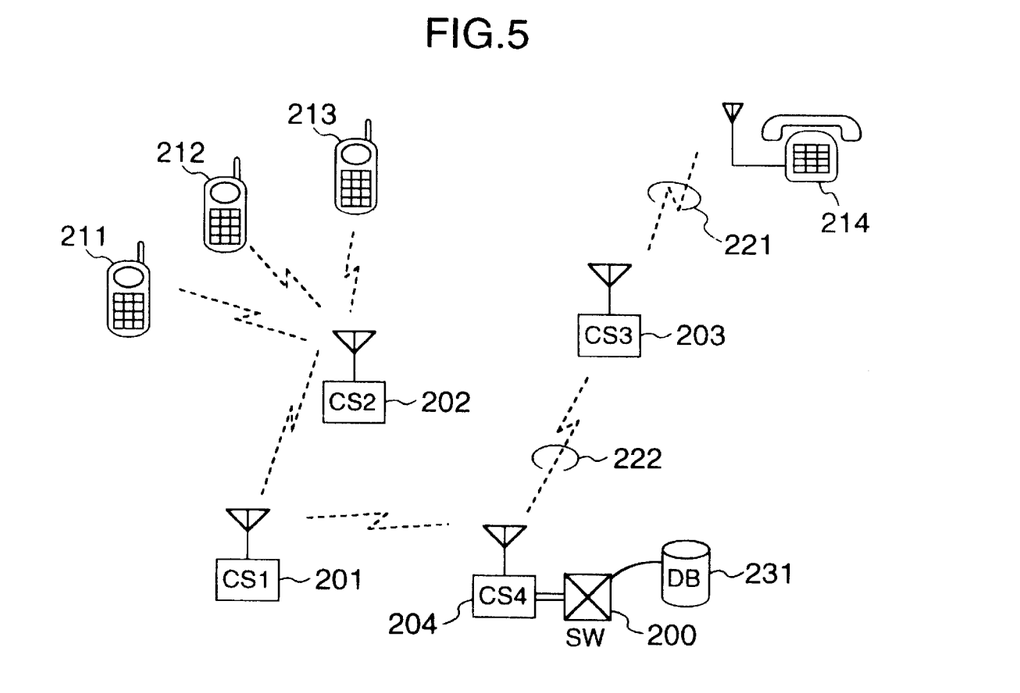
FIG. 5 is a diagram showing an example configuration of a radio communication system.

According to this embodiment, as shown in FIG. 5, a radio communication system can be realized which comprises at least one CS 204 connected to a switching system 200, a plurality of CSs 201 to 203 connected to CS 204 by means of a dynamic radio channel assignment and other CS, and a plurality of PSs connected by means of a dynamic radio channel assignment to each CS. In this radio communication system, each radio channel is dynamically assigned the connection between a CS and a PS or the connection between CSs. In the case shown, the location of CS 202 is registered in CS 201, and those of CSs 201 and, 203 are registered in CS 204. PSs 211, 212, 213 with the locations thereof registered in CS 202, therefore, are connected to SW 200 through CSs 202, 201, 204, while PS 214 with the location thereof registered in CS 203 is connected to SW 200 through CSs 203, 204.

As described above, according to this embodiment, a radio channel of a CS used also for accommodating a PS is utilized only when required to relay between CSs. In this way, a CS which is not directly connected to the switching system is connected to the switching system. A separate transmission path to SW, therefore, is not required for each CS.

Also, a CS registers the location thereof in other CSs communicable by a radio channel. Specifically, according to this embodiment, the same protocol used between a PS and a CS which are granted mobility is also used between CSs. Therefore, a protocol processing section or the like is not required in the CS configuration for relay between CSs.

Some modifications will be explained.

In the above-mentioned radio communication system, calls may be classified into an emergency call, a priority call and other types of call, so that a radio channel is always secured between CSs for emergency and priority calls. In securing such a radio channel, two CSs negotiate each other to determine a radio channel used for emergency or priority call when one of them registers the location thereof in the other CS, which radio channel is not assigned for other than emergency and priority calls.

By doing so, even a system in which a radio channel is dynamically assigned can guarantee the use of the radio communication system according to the invention for emergency and priority calls.

Also, a link channel may be fixedly installed between CSs. This can be realized by making an arrangement in such a way that the link channel used for location registration from one CS to another is fixedly utilized as a link channel between them. In such a case, the process of setting a link channel can be saved at the time of originating call or incoming call described in the above embodiments.

Also, a memory for storing data temporarily may be arranged in the CS, and a call exclusive for data transmission may be handled in the following-described manner. A radio channel is established between PS and CS or between CS and CS independently in the order of data transmission. The data transmitted through a channel first established is stored in the memory of CS. Upon establishment of the next channel, the data is read out of the memory and transmitted.

The data transmission call may be distinguished by the flag in the call setting together with emergency and priority calls.

Each CS can have the location information of a plurality of other CSs. At the same time, the order of priority can be incorporated in the information.

Each CS may set up a radio channel with other CSs according to this order of priority. Specifically, a CS selects other CSs in the order of priority, and tries to set up a radio channel with a CS ranking next in the order of priority until a radio channel can be set up with a CS selected after accessing prior CSs having no unoccupied lines.

The present invention is applicable not only to cordless telephone systems like PHS but also to a radio communication systems such as cellular telephone systems and also WLL (Wireless Local Loop) systems with equal effect.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A radio communication system, comprising:

at least one switching system;

at least one first cell cite (CS) which is connected to said switching system;

at least one second CS which is not connected to said switching system; and a plurality of personal stations (PS);

wherein said first CS includes means for accommodating a plurality oif radio channels that can dynamically establish a communication channel connecting said first CS with said PSs and said second CS, said second CS includes means for accommodating a plurality of radio channelsi that can dynamically establish a communication channel connecting said second CS with said PSs, said first CS and others of said second CSs, and for relaying the radio channel, wherein said first CS registers in said switching system the location information of said PSs and said second CS connected thereto by said radio channels, wherein said second CS registers the location informnation of said PSs, said first CS and said others of said second CSs connected thereto by said radio channels, in said switching system through said first CS, and wherein said PSs connected to said second CS by said radio channels are connected to said switching system through said first CS.

2. A radio communication system according to claim 1, wherein said switching system determines the route between said switching system and said second CS according to said registered location information when a called party PS is connected to said second CS.

3. A radio communication system according to claim 1, wherein at least one dedicated radio channel is installed between said first CS and said second CS or between said second CSs.

4. A radio communication system according to claim 1, wherein said radio communication is conducted according to personal headphone protocol RCR STD-28.

5. A radio communication system according to claim 1, wherein said second CS includes means for storing identifiers of said first CS and said others of said second CSs connectable by a radio channel and the order of priority of connection among said CSs, and said second CS tries to establish a radio channel with other CSs in accordance with the order of stored priority.

6. A radio communication system according to claim 3, wherein calls are classified as an emergency call, a priority call or another call, and said first and second CSs assign said dedicated radio channel to an emergency call and a priority call.

7. A radio communication system according to claim 1, wherein said second CS includes means for temporarily storing data exchanged with said PSs, and when one channel is established, said second CS receives the exchanged data, stores the recieved exchange data therein temporarily until the other channel is established, and reads and transmits the data from said memory means after establishing the other channel.

8. A radio communication system according to claim 1, wherein said switching system sets the determined route between the switching system and said second CS in the call set-up message.

9. In a radio communication system including at least one switching system, at least one first cell site (CS) connected to the switching system and a plurality of personal stations (PS), a method for accommodating at least one second CS which is not connected to said switching system, said method comprising the steps of:

routing, by said second CS, a plurality of radio channels between said PSs, and first CS and others of said second CSs;

registering in said switching system the location information of said PSs and said second CS connected to said first CS by a radio channelby said first CS; and registering the location information of said PSs, said first CS and said others of second CSs connected to said second CS by a radio channel, in said switching system through said first CS connected by a radio channel by said second CS, wherein said PSs connected to said second CS by a radio channel are connected to said switching system through said first CS.

* * * * *